Nov. 2, 1948.   E. J. JONES   2,453,073
SLIP RING STRUCTURE

Filed Nov. 13, 1945   3 Sheets-Sheet 1

INVENTOR
EDGAR J. JONES
BY
ATTORNEYS

Nov. 2, 1948.                    E. J. JONES                    2,453,073
                              SLIP RING STRUCTURE

Filed Nov. 13, 1945                                      3 Sheets-Sheet 2

INVENTOR
EDGAR J. JONES
BY
ATTORNEYS

Nov. 2, 1948. E. J. JONES 2,453,073
SLIP RING STRUCTURE
Filed Nov. 13, 1945 3 Sheets-Sheet 3

INVENTOR
EDGAR J. JONES
BY
*Edward R. Hathaway*
ATTORNEYS

Patented Nov. 2, 1948

2,453,073

UNITED STATES PATENT OFFICE 2,453,073

SLIP-RING STRUCTURE

Edgar J. Jones, Cambridge, Mass., assignor to The Baldwin Locomotive Works, a corporation of Pennsylvania Application November 13, 1945, Serial No. 628,189

10 Claims. (Cl. 173—324)

1

This invention relates to slip rings, and more particularly to split slip rings such as may be applied to a shaft having end flanges or the like.

Slip rings as have been provided in the past have recognized that solid rings on the torque shaft are truer and better arranged for long life under high speed conditions, but that there are certain types of shafts to which the solid rings cannot be applied. An illustration of this, which may be considered as typical, may be found in the drive shafts for certain ship installations where it is desired to apply slip rings as parts of a torque meter, for instance, where the shaft has flanges of such location and size as to preclude endwise attachment of the rings. In attempts to solve the problem presented by this type of shaft, resort has been made to application of the rings as strips wound about the shaft, with the ends in abutting relation, in which position they are welded or brazed or otherwise forced and held in such abutting position. It has been found that despite the care used and the skill displayed, there has almost inevitably been left an area which is "out of round" and which forms a great or small abutment which engages the brushes in the rotation of the shaft and both wears out the brushes and also varies the electrical transfer during the rotation, to a degree which militates against the success of the installation.

It is among the objects of this invention: to obviate the disadvantages of the prior art structures; to provide slip rings which can be applied as split elements applied laterally of the shaft and which in position are free from bumps or irregularities; to provide a slip ring having end portions in relative juxtaposition in a circle in which the transition from one end to the other is by a smooth continuous surface and of constant electrical value in its output to a brush; and many other objects and advantages will become more apparent as the description proceeds.

In the accompanying drawings forming part of this description:

Figure 2:
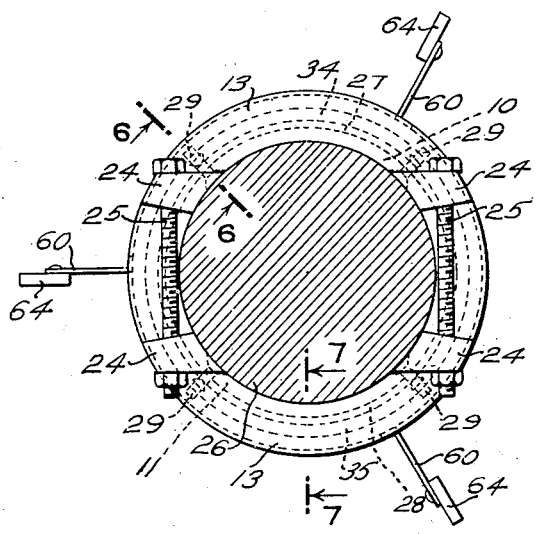
Fig. 2 represents an end elevation of the assembly of rings and brushes, with the shaft upon which the rings are mounted.
Figure 3:
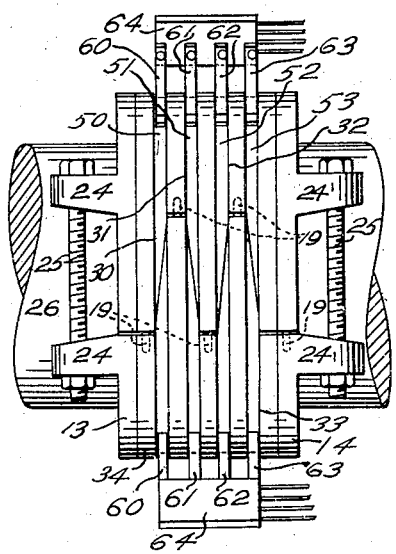
Fig. 3 represents a side elevation of a set of slip rings and brushes according to the invention as shown in Fig. 2.
Figure 4:
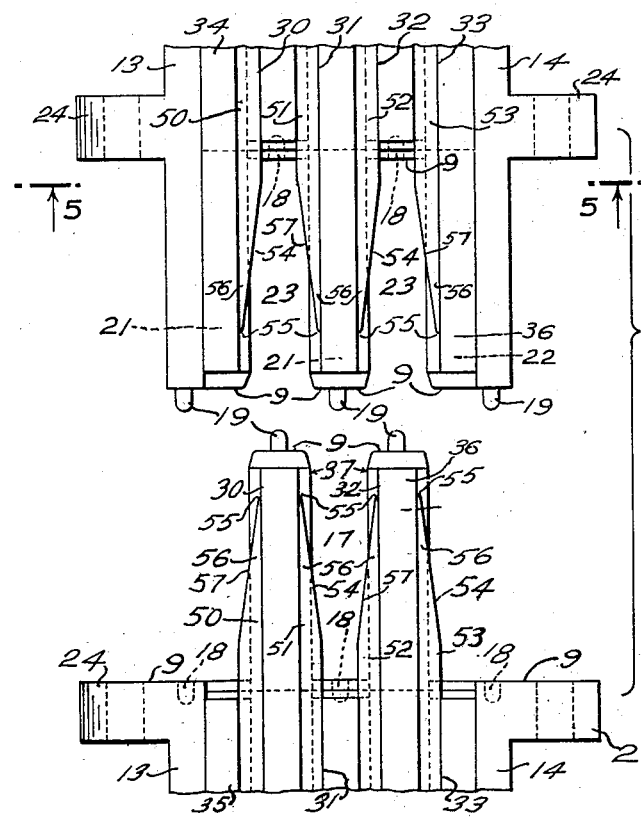
Fig. 4 represents an exploded fragmentary plan
Figure 5:
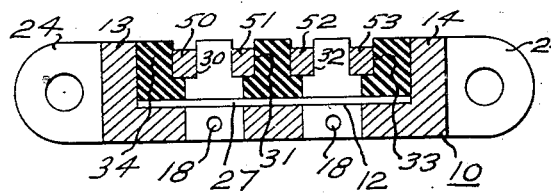
Figure 8:
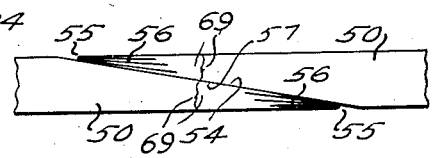
Figure 6:
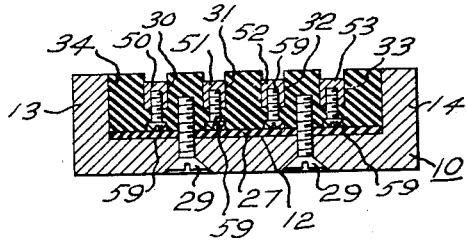
Figure 9:
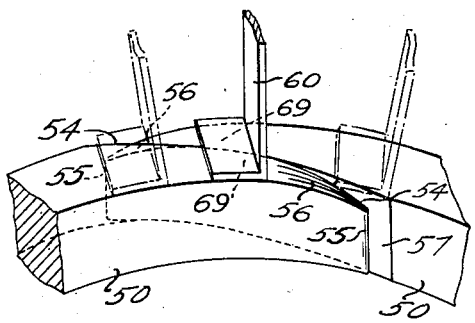
Figure 7:
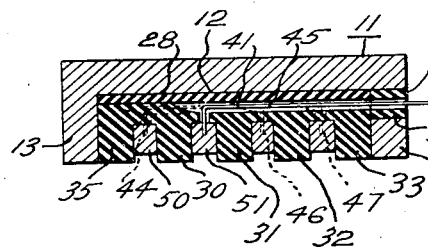

2 of the ends of the slip rings according to this invention, showing the relation of the parts as they approach interlocking engagement;

Fig. 5 represents a transverse section through the assembly of rings and insulating block supports thereof taken on line 5—5 of Fig. 4;

Fig. 6 represents a transverse section through the ring and insulating assembly taken on line 6—6 of Fig. 2;

Fig. 7 represents a transverse section through the rings and insulating support showing the manner of disposing of the lead-in wires for electrically supplying the respective rings;

Fig. 8 represents a fragmentary plan of the overlapping tapered respectively inturned ends of the slip ring components to establish a transition path in alignment with the circumferential surfaces of the respective ring ends;

Fig. 9 represents a fragmentary perspective of the same showing in full lines the contacting area between a brush and the two juxtaposed ends of the slip ring ends, and showing in dotted and dash lines the bearing engagement of the brush with the ring on both sides of the transition area.

Figure 10:
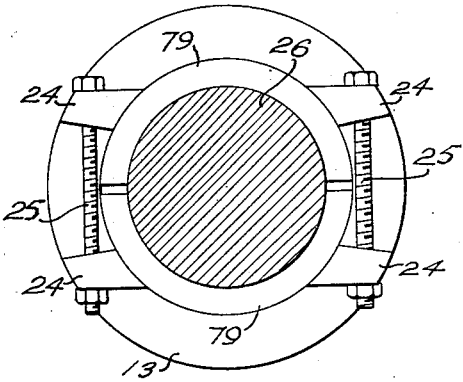

Fig. 10 represents an end elevation of the shaft and slip ring assembly according to the preferred form of the device, showing adapters between the shaft and the clamped assembly.

According to the preferred embodiment of the invention, composite supporting elements and slip rings are assembled as preformed complemental units for separate installation on a torque shaft or the like, and are subsequently anchored thereon as a complete whole without abutments or deviation from the annular in the surface of the slip rings.

Figure 1:
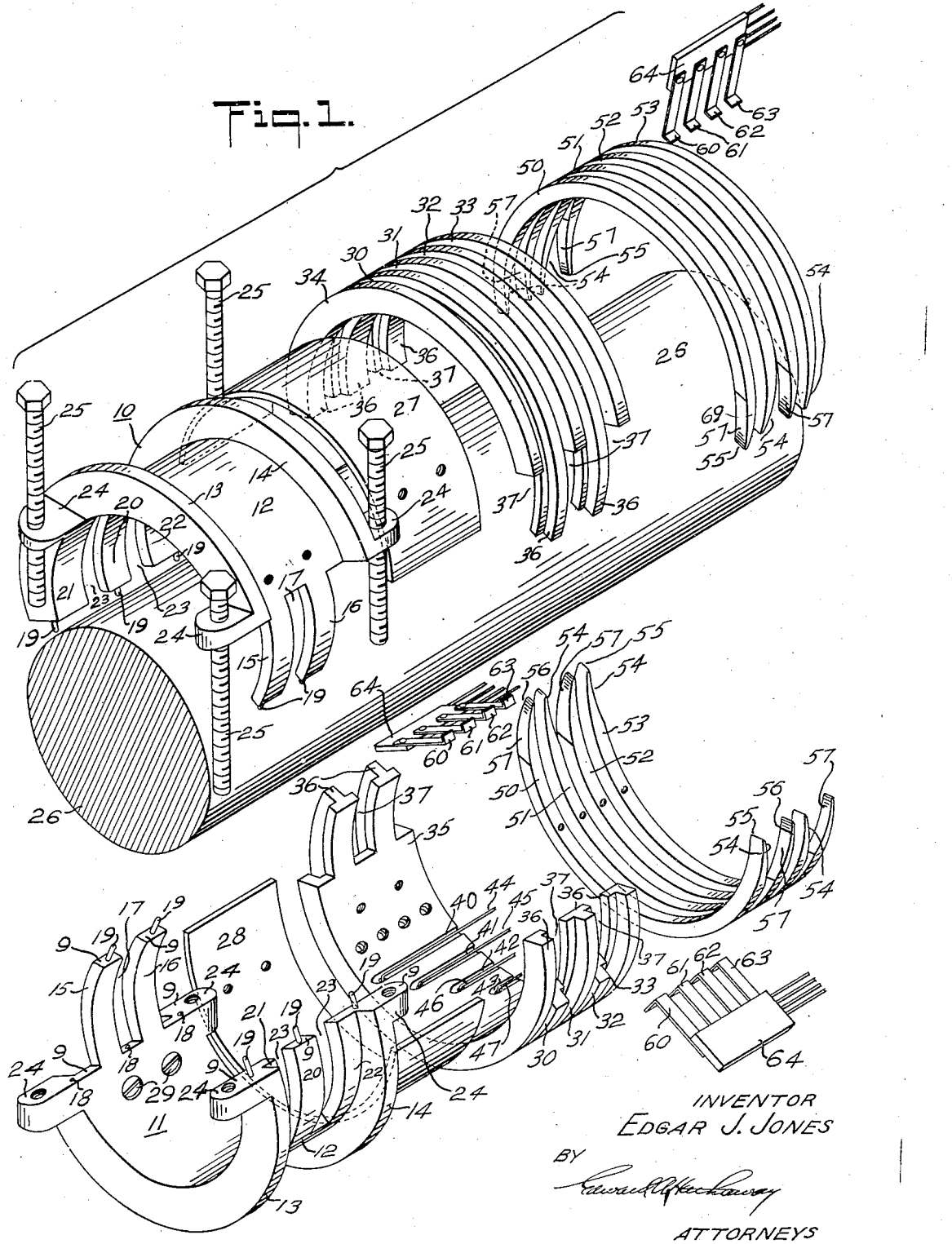
Fig. 1 represents an exploded perspective view of a shaft and the split slip rings of the invention.

Referring to Fig. 1, it will be seen that the slip ring assembly comprises preferably an inner metal clamping section, an insulating bearing portion, a slotted insulating block section, and, finally, the metal slip ring portions, to be described. The metal clamping sections are illustratively of steel, and are preferably in two complemental halves 10 and 11. Each is internally conformed to the given shaft, or to inserted adapters, and each has complemental interlocking fingers. Each is provided with an external semi-cylindrical surface 12, bounded axially by peripheral upstanding flanges 13 and 14, and the cylindrical surface extends in one direction coextensive with and terminating at the ends of a pair of spaced, preferably rectangularly shaped fingers 15 and 16, with the axially outer edges of the fingers 15 and 16 in parallel spaced relation by a finger width to the inner surface of the respective adjacent flanges 13 and 14. The fingers 15 and 16 are also spaced apart by a median space 17 of finger width. The fingers 15 and 16 on the respective portions 10 and 11, are on respectively opposite ends of the parts in juxtaposition. At the other ends of the portions 10 and 11 a central finger 20 is provided of such width as to pass and fit snugly in the space 17 of the complemental portion. The flanges and semi-cylindrical surface 12 are prolonged into fingers 21 and 22, with spaces of finger width as at 23 between median finger 20 and fingers 21 and 22, so that the respective fingers and spaces on one end portion are staggered relative to those of the juxtaposed portion. Thus, in assembly, fingers 20, 21 and 22 laterally straddle fingers 15 and 16 to form a substantially completely closed cylindrical member having a substantially continuous cylindrical surface 12 and substantially continuous flanges 13 and 14. All fingers and spaces terminate in substantially radial faces 9 and the inner cylindrical surfaces of the fingers are either cut tangentially so as to pass over the diameter of the shaft or depending upon the diameter may be slightly sprung when passed over the shaft. Centering holes and pins as at 18 and 19 may be provided in faces 9 to facilitate such jointure or aligning. Preferably the assembled condition effects slight clearance between abutting surfaces to permit tightening of the assembly on the shaft 26. Ears 24 are arranged in pairs on the respective clamping portions in parallel spaced relation in the ultimate assembly to enable stud bolts or the like 25 to pass through juxtaposed ears 24 to draw the parts together in tight clamping engagement on the shaft 26, or on adapters 79, as shown in Fig. 10.

Preferably a pair of insulating shims or bearing members of semi-cylindrical form are provided, anchored to the respective insulating portions 27 and 28, by means to be described, to establish an insulating barrier across the entire cylindrical surface of the assembled base elements between the aligned flanges thereof. These elements 27 and 28 are illustratively formed of any well-known thermal-setting material or the like and are relatively thin.

The actual ring contacting portions of the assembly are preferably two complemental turned portions of opposite halves of a section of a linen base thermal-setting tube or other rigid insulating medium of an axial length, such as to fit snugly between flanges 13 and 14 and of such thickness as to be substantially flush with the outer surfaces of such flanges, and comprise together a base having a plurality of external milled or turned peripheral angular slots, illustratively, four in number, and respectively designated as 30, 31, 32 and 33. The juxtaposed halves 34 and 35 of the complete cylindrical insulating block at opposite ends have each relatively staggered fingers and spaces, as at 36 and 37, analogous to and respectively substantially registering radially with the fingers and spaces of the inner metal members 10 and 11 to enable the fingers to overlap laterally and establish the complete assembly of the desired substantially continuous peripheral slots 30 to 33 inclusive. The inner circumference of the parts 34 and 35 in assembly is such as to conform closely with the outer surface of the bearing insulation members 27 and 28. The respective base elements are screwed directly to blocks 34 and 35 respectively by screws 29, which also anchor the insulating shims 27 and 28. The inner surfaces of the insulating block members, such as shown on block 35, are provided with a series of transverse slots, respectively, 40, 41, 42 and 43, of progressively decreasing length from the side thereof, in order to receive and insulate the input wires respectively 44, 45, 46 and 47 for the metal rings, to be described. Complemental aligned apertures 39 with insulating bushings 49 are formed in the juxtaposed flange 13 or 14 of the metal base elements 10 or 11, as shown in Fig. 7.

The assembly of the respective halves is completed by providing on each a plurality of metal slip ring components, respectively 50, 51, 52 and 53, of such width as to slide into and fit in the respective slots 30 to 33 inclusive, and of such thickness as to lie well below the outer surface of the insulating block so that the brushes to be described can be guided in the slots while making contact with the rings. The ring portions are anchored in the insulating blocks by screws 59, insulated from the metal bearing blocks by the insulating shim elements 27 and 28.

Each arcuate slip ring portion or component is preferably rectangular in cross section throughout almost all of its entire length to radial lines on opposite lateral faces at the respective ends thereof, from which lateral sloping faces respectively 54 and 57 are provided, forming with the adjacent side surface of the ring component the relatively sharpened edge 55. The external surface of the ring components is cylindrical and the annular extent maintains to a final or terminal contact area 69 disposed on the tapering ends thereof at a point or line well beyond the respective centers of the tapering surfaces 54 and 57, and from which the outer surfaces are bevelled off radially inwardly to a slight taper to the point 55, as at 56. Because of the terminal contact area 69 extending beyond the centers of the tapering surfaces 54 and 57, the peripheral extent of bevelled surface 56 is less than half the length of the respective overlapping portions. When complemental ring portions are arranged in assembly with the respective supports thereof which have been described, the laterally sloping surfaces 54 and 57 are in confronting laterally overlapping relation to form a complete assembled ring having uniform lateral width throughout, maintaining the lateral dimensions of the rectangular ring components, and providing at the joints two laterally aligned contact surfaces 69 which are of the same rectangular section in assembly as the individual ring components. Owing to the short external taper 56 at the very point 55 of the joint portions, however, the rectangular section is missing on each side of the areas 69, and the areas of the sections adjacent to the tapered ends is smaller than that of the ring component section as well as of the laterally aligned areas 69. The point formed by edge 55 and taper 56 is below or within the peripheral extent of the brush contacting area, as shown in Figs. 8 and 9. The wires 44 to 47 inclusive pass through the slotted insulating block into electrical contact with the respective rings, and lie in the slots or recesses 40, 41, etc., from which they emerge laterally axially of the shaft to which the unitary structure is applied.

A plurality of sets of brushes are provided, illustratively three in number, preferably, although not necessarily, symmetrically spaced, each comprising brush elements 60, 61, 62 and 63, having angular terminals so as to ride in the slots in contact with the rings, and mounted on respective insulating blocks 64, from which suitable leads extend from the respective brushes. These are suitably mounted relative to the assembly on the shaft.

The components are preferably carefully performed for the diameter of shaft to which they are to be applied, although small differences in effective diameters can be made up by suitable adapter blocks, such as 79.

In applying the slip rings, a pair of the completely assembled sub-units as described, each comprising the metal base, insulating strips, main supporting blocks, and partial slip rings, and the electrical leads therefor, are brought together about the periphery of the shaft 26, and the overlapping and interfitting elements are brought into conforting juxtaposition, and guided together to form a complete unitary assembly, which is clamped in position by the stud bolts 25. The brush assemblies are then brought into position bearing against the respective rings. With the laterally tapered ends adjacent the sharp points of the slip ring ends in lateral overlapping relation as shown, it will be seen that the bevelled off outer surfaces at the points lie below the level of the main portions of the rings behind the respective pointed ends, so that a brush relatively riding on the solid unjointed portion of the rectangular ring elements and having an established electrical transfer path passes a transition area formed of lateral aligned areas 69 in the center of the joint. It does not encounter or contact the very end point of either slip ring portion, as this is below the level or circumferential extent of the slip ring on which it is riding. The transition from one ring component to the next is smooth and free from all forms of irregularities or abutments such as have characterized abutting ring portions of the past.

The utility and advantage of the slip ring assembly shown will be clear.

I claim:

1. A split slip ring assembly comprising a plurality of segmental slip ring elements each having laterally tapered substantially planar-surfaced portions and whose peripheral surfaces within the last half of their length are bevelled radially inwardly of the ring, and the adjacent ends of said tapered portions being disposed in laterally abutting juxtaposition whereby the bevelled peripheral surfaces of said adjacent ends extend away from each other to assure smooth transition from one segment to the other along their periphery.

2. A slip ring assembly comprising a supporting base, an insulating support and a slip ring, said assembly being arranged for mounting on a shaft, and said slip ring having portions overlapping laterally with the terminals of the respective overlapping portions bevelled radially inwardly of the ring, the bevelled portions being for a peripheral extent less than half of the overlapping portions so that the peripheral circumferential surface of the slip ring is continuous through the central areas of the overlapping portions only.

3. A slip ring assembly comprising two complemental supporting plates having in assembly a bearing surface, a supporting block formed of complemental insulating portions defining a peripheral slot and mounted respectively on the respective supporting plates, slip ring components mounted on each supporting block insulating portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, said line of jointure having portions only which are circumferentially of the same level as the components.

4. A slip ring assembly comprising two complemental supporting plates having in assembly a bearing surface, a supporting block formed of complemental insulating portions defining a peripheral slot and mounted respectively on the respective supporting plates, slip ring components mounted on each supporting block insulating portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, said line of jointure having portions only which are circumferentially of the same level as the components, and the line of jointure at its extreme ends comprising components of different circumferential levels.

5. A slip ring assembly comprising two complemental supporting plates having in assembly a bearing surface, a supporting block formed of complemental insulating portions defining a peripheral slot and mounted respectively on the respective supporting plates, slip ring components mounted on each supporting block insulating portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, said complemental plates having fingers and spaces to enable lateral overlapping telescoping assembly of the plates on a shaft while maintaining a substantially continuous bearing surface.

6. A slip ring assembly comprising two complemental supporting plates having in assembly a bearing surface, a supporting block former of complemental insulating portions defining a peripheral slot and mounted respectively on the respective supporting plates, slip ring components mounted on each supporting block insulating portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, said complemental plates having peripheral flanges, and said insulating blocks being disposed between said flanges.

7. A slip ring assembly comprising two complemental supporting plates having in assembly a bearing surface, a supporting block formed of complemental insulating portions defining a peripheral slot and mounted respectively on the respective supporting plates, slip ring components mounted on each supporting block insulating portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, and insulating semi-cylindrical members disposed between the supporting plates and the insulating blocks.

8. A slip ring assembly comprising two complemental supporting plates having in assembly a bearing surface, a supporting block formed of complemental insulating portions defining a peripheral slot and mounted respectively on the respective supporting plates, slip ring components mounted on each supporting block insulating portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, insulating semi-cylindrical members disposed between the supporting plates and the insulating blocks, means securing the ring components to the insulating blocks only, and separate means connecting the insulating blocks and semi-cylindrical members to the supporting plates to form unitary assemblies.

9. A slip ring assembly comprising two complemental supporting plates having in assembly a bearing surface, a supporting block formed of complemental insulating portions defining a peripheral slot and mounted respectively on the respective supporting plates, slip ring components mounted on each supporting block insulation portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, said insulating blocks having terminal fingers and spaces in relatively staggered relation to enable lateral overlapping telescoping assembly of the blocks on the plates while maintaining a substantially continuous peripheral surface.

10. A slip ring assembly comprising two complemental supporting plates having in assembly a bearing surface, a supporting block formed of complemental insulating portions defining a peripheral slot and mounted respectively on the respective supporting plates, slip ring components mounted on each supporting block insulating portion, each slip ring component having a surface laterally inclined with respect to a plane normal to the ring axis and leading to a substantial point, each slip ring portion establishing with its complemental slip ring a plurality of joints and each joint comprising a radially extending line of jointure elongated in the direction of the slip rings, said complemental plates having fingers and spaces to enable lateral overlapping, telescoping assembly of the plates on a shaft while maintaining a substantially continuous bearing surface, said insulating blocks having terminal fingers and spaces in relatively staggered relation in substantial registration with the fingers and spaces of said plates to enable lateral overlapping telescoping assembly of the blocks on the plates while maintaining a substantially continuous peripheral surface.

EDGAR J. JONES.

REFERENCES CITED

The following references are of record in the file of this patent:

UNITED STATES PATENTS

| Number | Name | Date |
|---|---|---|
| 793,593 | Knoener | June 27, 1905 |
| 1,075,292 | Kingsbury | Oct. 7, 1913 |
| 1,219,247 | Carmichael | Mar. 13, 1917 |
| 1,796,553 | Basterriex | Mar. 17, 1931 |